United States Patent [19]

Schpok et al.

[11] 4,254,839
[45] Mar. 10, 1981

[54] RADIAL FORCE ANTI-EXTRUSION DEVICE FOR SEALED DRILL STRING UNIT

[75] Inventors: Ricky K. Schpok, Dallas; Leo A. Martini, Mesquite, both of Tex.

[73] Assignee: Dresser Industries, Inc., Dallas, Tex.

[21] Appl. No.: 50,727

[22] Filed: Jun. 21, 1979

[51] Int. Cl.$^3$ .............................................. E21B 10/22
[52] U.S. Cl. .................................. 175/372; 175/228; 175/345; 308/8.2; 308/187
[58] Field of Search ............... 175/345, 227, 228, 229, 175/371, 372, 325, 337, 359; 308/8.2, 187

[56] References Cited

U.S. PATENT DOCUMENTS

| | | | |
|---|---|---|---|
| 1,909,128 | 5/1933 | Scott et al. | 175/228 X |
| 2,187,037 | 1/1940 | Kirkpatrick | 175/372 X |
| 3,303,898 | 2/1967 | Bercaru | 175/228 |
| 3,332,505 | 7/1967 | Schumacher, Jr. | 175/372 |
| 3,395,955 | 8/1968 | Mansell et al. | 308/187 |
| 3,419,093 | 12/1968 | Lichte et al. | 175/228 |
| 4,020,910 | 5/1977 | Petersen et al. | 175/345 |
| 4,172,502 | 10/1979 | Nederveen | 175/372 X |

Primary Examiner—James A. Leppink
Assistant Examiner—Richard E. Favreau
Attorney, Agent, or Firm—Eddie E. Scott; Fred A. Winans

[57] ABSTRACT

A drill string reamer-stabilizer includes a main body adapted to be connected as an element of a rotary drill string. Individual bearing shafts are mounted axially along the exterior of the main body to support roller cutters that engage the wall of the borehole. Seal units are positioned around each bearing shaft between each roller cutter and bearing shaft to define a lubricant space. The seal units retain lubricant in the lubricant space and prevent contaminating fluid and materials in the borehole from entering the lubricant space. At least one seal unit comprises an annular cup-shaped elastomer seal member mounted in an annular seal gland in the roller cutter. The seal gland has an inner side adjacent the lubricant space and an outer side exposed to the fluid and materials in the borehole. A split-ring annular spring member fits in the cup-shaped elastomer seal member and maintains the seal member spaced from the outer side of the seal gland so that internal pressure in the lubricant space is vented outward past the seal member but external pressure of fluid and materials in the borehole forces the seal member against the inner side of the seal gland creating a fluid tight seal.

3 Claims, 6 Drawing Figures

FIG. 1
FIG. 2
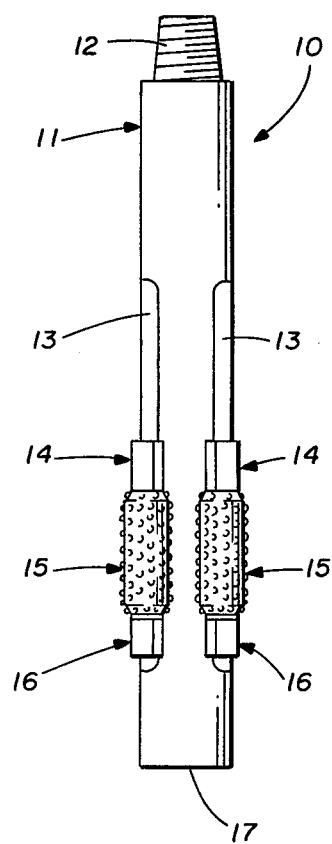
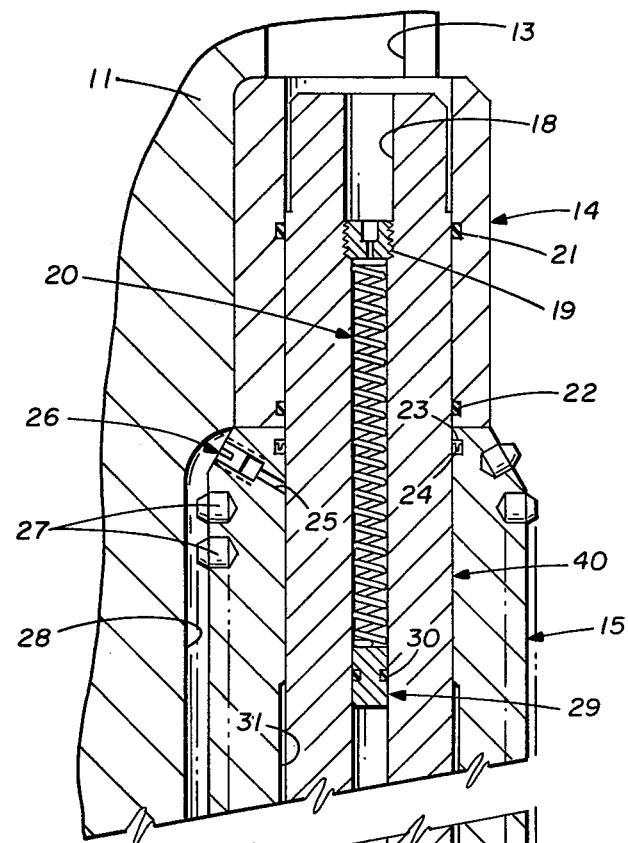
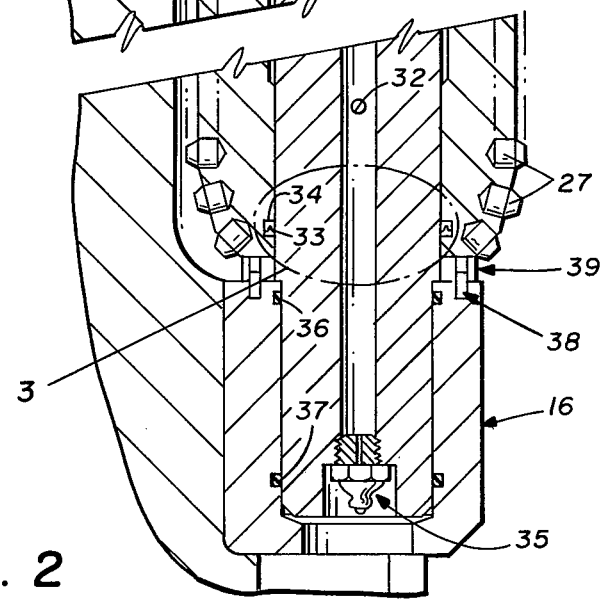

RADIAL FORCE ANTI-EXTRUSION DEVICE FOR SEALED DRILL STRING UNIT

BACKGROUND OF THE INVENTION

The present invention relates to the art of earth boring and, more particularly, to a drill string unit adapted to be connected as a member of a rotary drill string. A drill string unit generally comprises a body threaded at at least one end for incorporation in a rotary drill string. This body supports a multiplicity of bearing shafts. A rotary cutter is rotatably mounted upon each bearing shaft. The drill string unit must operate under very severe earth boring conditions, and the size and geometry of the drill string unit is restricted by the operating characteristics. The economics of petroleum production and earth boring demand a longer lifetime and improved performance from the drill string unit. Attempts to increase the lifetime and improve the performance of the drill string unit have included sealing and lubricating the rotary cutters. The sealing and lubricating systems have encountered problems created by the environmental conditions encountered in earth boring.

A wide variety of environmental conditions affect the performance of the drill string unit. For example, the temperature will rise as the borehole penetrates deeper into the earth and temperatures of up to 325° F. are presently being encountered. Deep wells now being drilled are expected to result in environmental temperatures of up to 400° F. and the drilling of steam wells results in environmental temperatures as high as 550° F. The elevated temperatures have an adverse effect on the lubricant, the structural elements of the lubrication system, the structural elements of the seal members and a substantial increase in the pressure of the lubricant within the lubrication system may be encountered.

DESCRIPTION OF PRIOR ART

In U.S. Pat. No 3,413,045 to William Isaac Wohefeld, patented Nov. 26, 1968, a sealed lubricated reamer-stabilizer is shown. The abstract of the disclosure provides the following description. Metal roller of large hole reamer-stabilizer is rotatably mounted on hollow spindle carried by body of reamer-stabilizer. Tapered roller bearings mount roller on spindle. Hollow spindle provides grease reservoir communicating through radial ports in spindle and thence through annulus between roller and spindle with the bearings adjacent ends of roller and spindle. Floating, face-type, pressure seals between each end of roller and spindle beyond bearings prevent entrance of drilling fluid into bearings and loss of grease from bearings. Entrance of grease into reservoir is provided through check valve type grease gun collector in plug closing one end of hollow spindle. Other end of hollow spindle is closed by a plug having a port therethrough. The port is closed by an elastic, e.g., fabric reinforced elastomer tube extending into hollow spindle, the end of the tube remote from the port being closed. Grease pumped into reservoir through check valve collapses tube and fills hollow spindle with grease which is maintained under pressure by elasticity of tube. As grease is lost in use of apparatus, tube expands, moving grease from reservoir in spindle to the bearings. When apparatus is subjected to pressure of drilling fluid deep in an earth bore, volume reduction of grease due to increased pressure is compensated by expansion of tube and flow of grease from spindle to bearings, thereby preventing movement of external fluid past seals into bearings. Pressure across seals never exceeds initial pressure when reservoir filled since external fluid pressure on seal is balanced by internal fluid pressure of grease which in turn is subjected to external fluid pressure acting on tube.

In U.S. Pat. No. 4,013,325 to I. G. Rear, patended Mar. 22, 1977, a stabilizing tool is shown. The abstract describes the stabilizing tool as comprising a substantially cylindrical body; said body having a plurality of substantially cylindrical chambers formed therein, said chambers being located axially within the body and spaced symmetrically around the body with respect to the longitudinal central axis thereof, wherein the diameter of the chambers is such that a portion of the wall would extend beyond the perimeter of the body to provide axial rectangular openings in the side of the body; each end of the body being provided with an axial fluid passageway which is divided to provide a fluid path through each chamber; stabilizing rollers rotatably mounted upon a hollow shaft mounted in said chambers such that the circumference of rotation of the rollers extend through said rectangular openings beyond the body; a lubricant reservoir provided in said body and vented to the fluid passageway for the application of fluid pressure to the lubricant in the reservoir; and outlets in the reservoir communicating with the bearing surfaces between the rollers and shafts.

SUMMARY OF THE INVENTION

The present invention provides a rotary drill string unit adapted to be connected as an element of a rotary drill string. The drill string unit includes a main body with at least one bearing shaft mounted on the main body. A roller member is rotatably mounted on the bearing shaft. Seal means are positioned around said bearing shaft between the roller member and the bearing shaft thereby defining a lubricant space. The seal means improves operation of the drill string unit in the drilling environment. The seal means retains lubricant in the lubricant space and prevents contaminating materials in the borehole from entering the lubricant space. The seal means includes an annular generally cup-shaped elastomer seal member located in a seal gland. An annular split-ring resilient member is inserted in the annular cavity of the cup-shaped elastomer seal member to urge the elastomer seal member spaced about the outer side of the seal gland. This allows internal pressure of lubricant within the lubricant space to be vented past the elastomer seal member. However the seal is shaped such that the pressure of fluid in the drilling environment will act on the elastomer seal member forcing it against the inner side of the seal gland and to form a fluid tight seal to prevent contaminating material from entering the bearing. The above and other objects and advantages of the present invention will become apparent from a consideration of the following detailed description of the invention when taken in conjunction with the accompanying drawings.

BRIEF DESCRIPTION OF THE DRAWINGS

FIG. 1 illustrates a drill string unit embodying the present invention.

FIG. 2 is an enlarged cut-away view of a portion of the drill string unit shown in FIG. 1.

DETAILED DESCRIPTION OF THE INVENTION

Figures 3, 4:
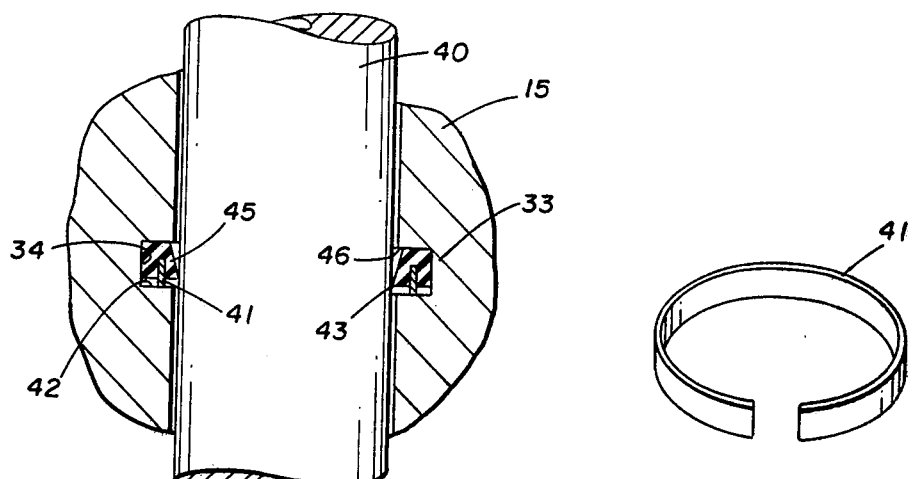
FIG. 3 is an enlarged view of a seal assembly of the drill string unit shown in FIG. 2.
FIG. 4 illustrates the spring element of the seal assembly shown in FIG. 3.

Referring now to FIG. 1, a drill string unit is illustrated generally at 10. The drill string unit shown is a reamer-stabilizer adapted to be connected as an element of a rotary drill string. The upper portion of the reamer-stabilizer is threaded with threads 12 in order that the reamer-stabilizer may be connected to the element of the drill string immediately above. The lower portion of the reamer-stabilizer includes internal threads 17 that connect the reamer-stabilizer to the drill string element immediately below. Drilling fluid enters a central passageway in the reamer-stabilizer 10 and is transported through the reamer-stabilizer 10. Three roller cutters are positioned on the reamer-stabilizer body 11. The roller cutters are rotatably mounted on three individual shafts. Two of the roller cutters 15 are shown in FIG. 1. The bearing shafts that support the roller cutters 15 are locked to the body 11 of the reamer-stabilizer 10 by blocks 14 and 16. The blocks 14 and 16 fit within grooves or recesses 13 in the body 11.

Referring now to FIG. 2, an enlarged view of one of the cutters 15 and a portion of the body 11 of reamer-stabilizer 10 is shown. The bearing shaft 40 is positioned on the body of reamer-stabilizer 10 and the roller cutter 15 is mounted on the bearing shaft 40. A recess 28 in the body 11 of the reamer-stabilizer 10 provides space for the roller cutter 15 to freely rotate. The roller cutter 15 includes a multiplicity of inserts 27. A thrust bearing element 39 is positioned below roller cutter 15. A series of dowel pins 38 hold thrust bearing element 39 in place.

The reamer-stabilizer 10 includes an upper block 14 and a lower block 16. Both the upper block 14 and lower block 16 include a bore for receiving the respective ends of bearing shaft 40. When the reamer-stabilizer 10 is assembled, the bearing shaft 40 is trapped between the uper block 14 and lower block 16. Seals 23 and 33 define a lubricant area 31 along a substantial portion of the length of the internal surface of the roller cutter 15 and external surfaces of bearing shaft 40. The upper seal 23 is positioned around the bearing shaft 40 between the roller cutter 15 and bearing shaft 40. The seal 23 fits within an annular groove or seal gland 24 in the cutter 15. The lower seal 33 is positioned around the bearing shaft 40. The seal 33 fits within a groove or seal gland 34 in the roller cutter 15. The two seals 23 and 33 define the lubricant area 31 along a substantial portion of the length of the internal surface of the roller cutter 15 and external surface of bearing pin 40. The seals and their function will be described in greater detail subsequently.

Two pair of O-ring seals are provided between the blocks 14 and 16 and the shaft 40. The upper seals 21 and 22 are positioned around the bearing shaft 40 between the block 14 and bearing shaft 40. The O-ring seals 21 and 22 fit within annular grooves in the block 14. The lower O-ring seals 36 and 37 are positioned around the bearing shaft 40. The O-ring seals 36 and 37 fit within annular grooves in the block 16.

The bearing pin 40 contains a central passageway 18. This central passageway 18 is closed at its lower end by a plug 35 containing a grease fitting. Holes 32 extend from the internal passageway 18 to the lubricated area between the bearing pin 40 and roller cutter 15. The upper end of the internal passage 18 is in communication with the outside of the reamer-stabilizer 10. A filler and/or bleed passage 25 extends through the roller cutter 15. This allows lubricant to be introduced through the grease fitting in plug 35 and completely fill the lubricant area 31. A plug 26 closes the filler passage 25. A pressure compensating floating piston 29 is located in the internal passageway 18 to equalize pressures in the lubricant area 31 with the external downhole pressures. This results in increased bearing cutter and seal life. The floating piston 29 includes an O-ring seal 30. The piston 29 is free to float in the internal passageway 18. A loss of lubricant within the lubricant area 31 will result in reduction of pressure in the lubricant area 31. The higher external pressures will cause the piston 29 to move, forcing additional lubricant into the lubricant area 31 and equalizing internal and external pressures. A spring 20 is positioned between piston 29 and plug 19 to bias the piston 29 toward the holes 32.

Referring now to FIG. 3, an enlarged view of the seal assembly 33 is shown. The seal assembly 33 retains lubricant in the lubricant space and prevents contaminating materials in the borehole from entering the lubricant space. The seal assembly 33 comprises an annular elastomer seal member 45 having an annular axially open cavity. A spring ring 41 is inserted in the cavity in the elastomer seal member 45. The spring ring 41 will deform radially yet maintain axial stiffness after installation. The spring ring 41 also extends axially from the cavity beyond the member 45 to space the number from the seal gland 34 to prevent seal extrusion from internal pressure and rotation of the seal relative to the gland, thereby allowing proper seal operation.

Referring now to FIG. 4, the spring ring 41 is shown individually. The spring ring 41 is a split metal ring. The spring ring is thin and has sufficient spring force to maintain a radial outward bias of the elastomer seal member 45 when the seal assembly is installed in the seal gland 34. The split therein permits the spring ring 41 to deform radially yet maintain axial stiffness after installation.

Figure 5:
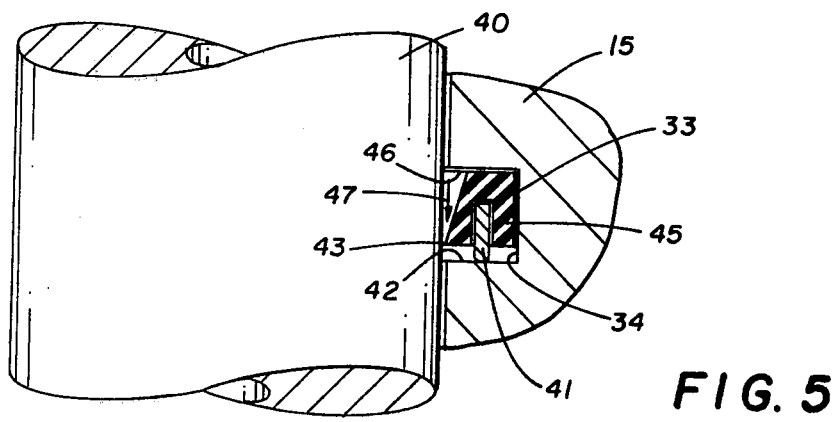
FIGS. 5 and 6 illustrate the operation of seal assembly shown in FIG. 3.
Figure 6:
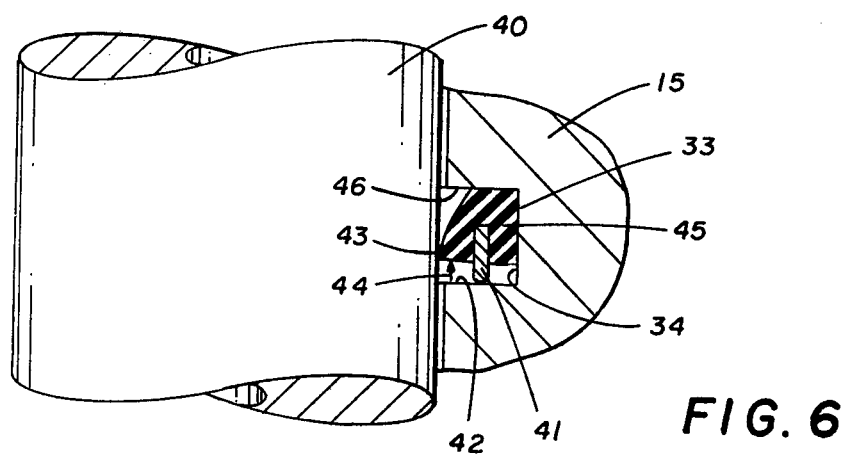

Referring now to FIGS. 5 and 6, the seal assembly 33 will be described under operating conditions in the borehole. The seal assembly 33 is positioned between bearing pin 40 and roller cutter 15 in the seal gland 34 in the cutter 15. The elastomer seal member 45 includes a wedge surface 43 generally facing the lubricant side. The pressure of fluid outside the drill string unit 10 is on the flat outer face and will tend to force the wedge surface 43 inward toward the bearing pin 40. Internal pressure of lubricant within the lubricated area however will tend to force the wedge surface 43 of elastomer seal member 45 axially downward and radially outward in the seal gland 34 allowing escape of volume within the lubricant space and the relief of internal pressures.

The hydrostatic pressure of fluid in the well bore is substantial and pressure differential between the pressure of lubricant inside the lubricant space 31 between the roller cutter 15 and bearing pin 40 would ordinarly develop that could damage the seal assembly 33 or introduce contaminants into the lubricant space. The environmental pressures surrounding the reamer-stabilizer 10 increases at the rate of approximately ½ pound per square inch for each foot of depth. This means that a depth of 10,000 feet, the hydrostatic pressure on the outside of the reamer-stabilizer 10 could be 5,000 p.s.i.

or more because of the weight of the drilling fluid in the well bore above the reamer-stabilizer 10. A wide variety of other environmental conditions also affect the performance of the reamer-stabilizer lubrication system. For example, the temperature will rise as the well bore penetrates deeper into the earth and temperatures in the range of 200° to 350° at 10,000 foot depth may be expected with even higher temperatures at greater depths. Periodic pressure variations are produced during the drilling operation and these pressure variations can damage the structural elements of the lubrication system.

The floating piston 29 helps insure that the pressure of lubricant inside the lubricant area 31 will be the same as the pressure of fluid in the borehole. The higher external pressures will cause the piston 29 to move, forcing additional lubricant into the bearing area and equalizing internal and external pressures. The seal assembly 33 provides a safeguard against an overfill or excessive pressure condition with the piston bottomed out. Should the pressure inside the bearing increase, after the piston 29 has bottomed out, it will overcome the restriction provided by the wedge surface 43 and the excessive air or lubricant will be vented out of the lubricant area 31 past the seal assembly 33.

As shown in FIG. 5, the higher internal pressure represented by the arrow 47 will force the elastomer seal member 45 axially downward toward the lower or outer side 42 of seal gland 34. The seal ring 41 extending from the member 45 spaces the member from the gland and prevents the elastomer seal member 45 from being forced against the outer side 42 of seal gland 34 and extruded into the clearance between bearing pin 40 and cutter 15. With the elastomer seal member 45 thus held above the outer side 42, the internal pressure 45 will cause the wedge surface 43 to deflect and internal pressure to be relieved.

As shown by FIG. 6, the pressure of fluid in the borehole represented by arrow 44 will force the elastomer seal member 45 axially upward deforming the member 45 toward the upper or inner side 46 of seal gland 34. The elastomer seal member 45 will be forced against the inner side 46 of the seal gland 34. This will force the wedge surface tighter against the bearing pin 40 and prevent the introduction of fluid and materials in the borehole into the lubricant area.

The structural details of a drill string unit 10 constructed in accordance with the present invention having been described, the operation of the reamer-stabilizer 10 will now be considered with reference to a drilling operation wherein a drilling fluid is circulated throughout the drill string. The reamer-stabilizer 10 is connected as an intermediate element of a rotary drill string. The rotary drill string is lowered into the borehole. The hydrostatic pressure of fluid in the borehole is substantial and pressure differential between the pressure of lubricant inside the lubricant space 31 between the roller 15 and bearing shaft 40 would ordinarily develop that could damage the seal assemblies 23 and 33 or introduce contaminates to the lubricant. The environmental pressures surrounding the reamer-stabilizer 10 increases at the rate of approximately ½ pound per square inch for each foot of depth when the drilling fluid is drilling mud. This means that at a depth of 10,000 feet, the hydrostatic pressure on the outside of the reamer-stabilizer 10 could be 5,000 p.s.i. or more because of the weight of the drilling mud in the well bore above the reamer-stabilizer 10.

A wide variety of other environmental conditions also affect the performance of the reamer-stabilizer lubrication system. For example, the temperature will rise as the well bore penetrates deeper into the earth and temperatures in the range of 200° to 350° at 10,000 foot depth may be expected with even higher temperatures at greater depths. Periodic pressure variations are produced during the drilling operation and these pressure variations can damage the structural elements of the lubrication system. During drilling, joints of pipe must be added to the drill string for progressively deeper penetration. In order to add a joint of pipe which is usually 30 foot in length, rotation of the drill string must be stopped and the entire drill string must be raised high enough to allow the kelly to clear the rotary table (35-50 feet). Since operation costs of an oil well drilling rig are quite high, the time the bit is off bottom and not drilling must be kept to a minimum. Therefore, the addition of a joint of pipe must be accomplished quickly and the drill string must be raised and lowered as rapidly as possible. This raising and lowering of the drill strings creates pressure variations that affect the lubrication system of the reamer-stabilizer 10. In addition, the mud pumps are sometimes stopped creating pressure variations.

The present invention allows the pressure inside the lubricant area 31 to be equalized with the pressure outside the reamer-stabilizer 10. The floating piston 29 helps insure that the pressure of lubricant inside the lubricant area 31 will be the same as the pressure of fluid in the borehole resulting in increased bearings, cutter and seal life. A loss of lubricant within the bearing will result in reduction of pressure in the bearing cavity. The higher external pressures will cause the piston 29 to move, forcing additional lubricant into the bearing area and equalizing internal and external pressures. The seal assembly 33 is a safeguard against an overfill or excessive pressure condition with the piston bottomed out. Should the pressure inside the bearing increase, after the piston 29 has bottomed out, it will overcome the restriction provided by the wedge surface 43 of seal assembly 33 and the excessive air or lubricant will be vented out of the lubricant area 31 past the seal assembly 33. The pressure of fluid in the borehole moves the elastomer seal member 45 into tighter sealing relationship with the bearing pin 40. The seal assembly 33 will be positioned in gland 34 by split ring 41 in a manner which will prevent seal extrusion and rotation of the seal relative to the gland, thereby allowing proper seal operation.

The embodiments of the invention in which an exclusive property or privilege is claimed are defined as follows:

1. An improved seal assembly for an earth boring tool having a tool body with a bearing shaft and a roller member mounted for rotation about said bearing shaft, said earth boring tool to be operated in a fluid drilling environment and lubricant to be maintained between said bearing shaft and said roller member, an annular seal gland in said roller member having an inner side exposed to said lubricant and an outer side exposed to said fluid drilling environment, the improvement comprising:

an annular elastomer seal member positioned in said seal gland and extending around said bearing shaft, said member sized to fit within said gland and defining an inner surface projecting from said gland into sealing engagement with said shaft and an outer surface facing said outer surface of said gland, an annular axially elongated cavity in said member opening to said outer surface and, a resilient split-ring member disposed in said cavity and axially extending therefrom beyond said outer surface for maintaining said elastomer member spaced from said outer side of said seal gland to prevent internal lubricant pressure from extruding the sealing face of said elastomer member into the clearance between said shaft and said roller member.

2. Structure according to claim 1 wherein said split-ring normally biases said elastomer member radially outwardly into engagement with said gland whereby said elastomer member rotates with said roller member.

3. Structure according to claim 2 wherein said split-ring comprises a metal spring ring having sufficient spring force to maintain a radial outward bias when installed in said cavity.

* * * * *